Sept. 28, 1965  R. G. JENNINGS  3,208,958
METHOD AND APPARATUS FOR PRODUCING PLASTIC FOAM
Filed March 4, 1963  2 Sheets-Sheet 2

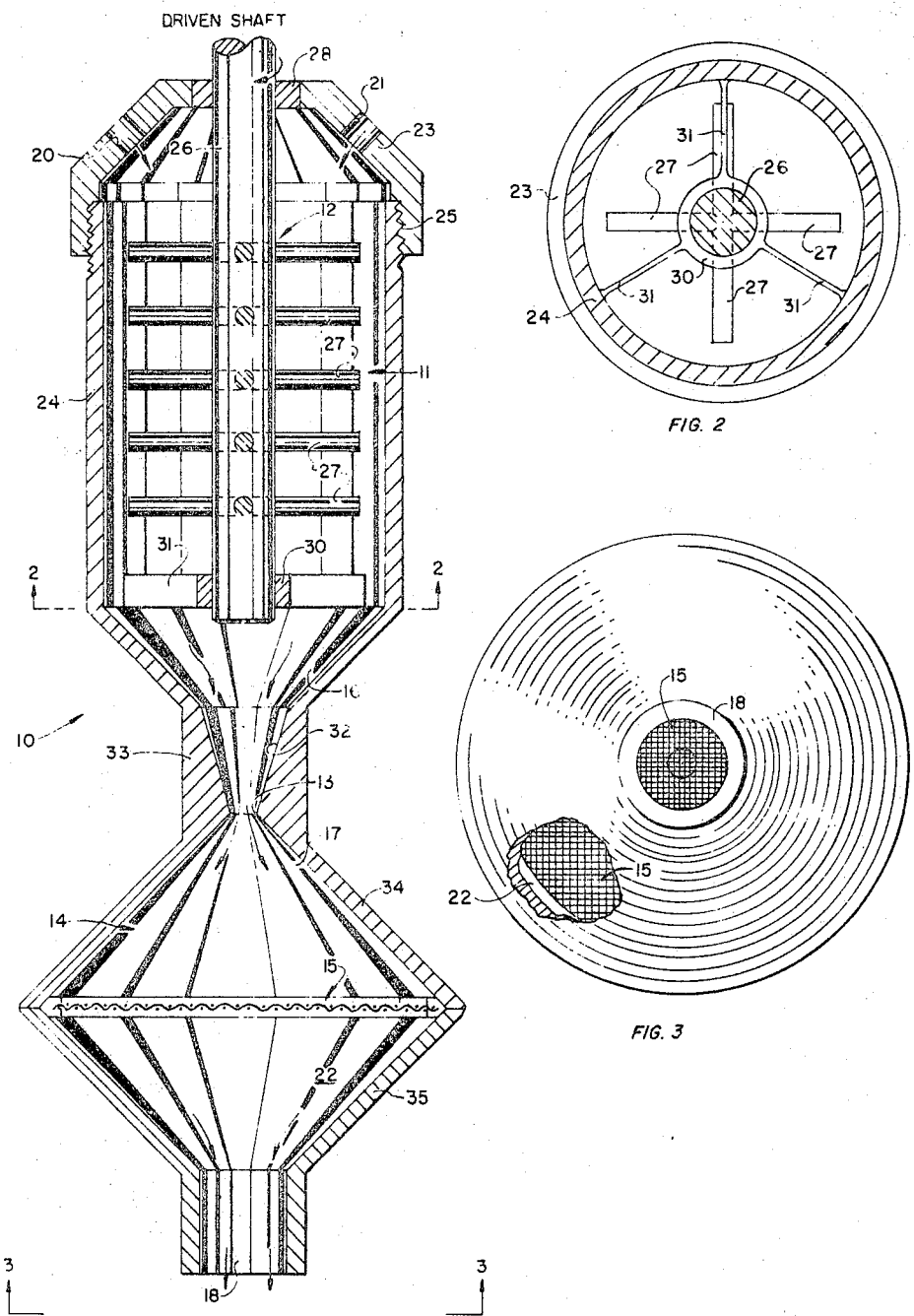

INVENTOR.
ROGER G. JENNINGS
BY
Owen, Wickersham & Erickson
Attorney

United States Patent Office 3,208,958
Patented Sept. 28, 1965

---

3,208,958
METHOD AND APPARATUS FOR PRODUCING PLASTIC FOAM
Roger G. Jennings, Kensington, Calif., assignor to Pacific Vegetable Oil Corporation, San Francisco, Calif., a corporation of California
Filed Mar. 4, 1963, Ser. No. 262,560
13 Claims. (Cl. 260—2.5)

This invention relates to the production of plastic foam, and more particularly to a method of and devices for producing a homogeneous pre-expanded plastic foam by a froth technique.

Plastic in foam or cellular form has established itself as a preferred material in many fields. Toys are made of plastic foam, furniture cushions are filled with it, rugs are padded with it, insulation for sound and heat is made from it, docks, piers and even bridges are floated on it, and buildings are constructed with it.

The froth technique of making articles from plastic foam involves "pre-expanding" the foam, delivering it in a fluid state into a mold or other shaping device, and hardening it there. It is distinguished from the "foamed in place" technique in which the foaming takes place only after delivery to the shaping device. This froth technique is capable of producing good results; however, in order to produce a satisfactory product, the foam should be delivered to the mold in a homogenous condition, that is without voids (large areas of discontinuity, as distinguished from the desired cells) and without undersized or oversized cells. To do this has been difficult because of a pressure change that occurs in the process. Preparation of these plastic foams involves feeding the components into a mixing vessel, usually by a positive displacement pumping system capable of maintaining relatively accurate proportions of the components. These components are then mixed in the vessel under high pressure and dispensed from the vessel at atmospheric pressure. The abrupt change from high pressure to atmospheric often causes a previously homogeneous foam to break into an undesirable heterogeneous mixture of foam and air voids. Thorough mixing of the components of the foam helps to minimize the formation of these voids, but heretofore satisfactory mixing has required considerable power, has consumed much time, and has substantially increased the cost of the product.

Accordingly, an important object of my invention is to deliver a homogeneous plastic foam to the mold.

Another object is to provide a device for quickly achieving a thorough mixing of the components of a plastic foam composition.

Another object of my invention is to provide a device for producing a plastic foam composition at a minimum power cost.

Still another object of my invention is to provide a device for producing and delivering a homogeneous plastic foam, having cells of uniform size and no voids.

I have discovered that these and other problems heretofore encountered in the production of pre-expanded plastic foam can be overcome by introducing the components of the plastic foam into a pressurized tank containing a rapidly rotating shaft with a series of mixing pins or blades, forcing the mixture through a venturi system into an expansion chamber, and then forcing the mixture through a wire mesh screen or perforated plate assembly before it is delivered from the machine as a product. The combination of pressure and high-speed rotation of the mixing shaft in the mixing portion of my device quickly produces a uniform mixture of the plastic components. The venturi system speeds up the exit velocity of the mixture from the mixing chamber and forces it at an optimum rate into the expansion chamber. The wire screen mesh or perforated plate assembly breaks up any oversize cells and destroys any voids that might have formed in the plastic foam as it was expanding. The foam which emerges from the outlet of my device is substantially homogeneous and so is a superior product.

Other objects and advantages of my invention will become apparent from the following description and the accompanying drawings in which:

FIG. 1 is a view in side elevation and in section of a mixing, homogenizing and distributing device embodying the principles of my invention;

FIG. 2 is a view in section taken along the line 2—2 FIG. 1, showing the arrangement of the mixing blades and the lower support for the shaft;

FIG. 3 is a bottom view taken along the line 3—3 of FIG. 1 showing the bottom of the recompression chamber, part of the strainer, and the outlet, a portion of the recompression chamber being broken open and shown in section in order to show the strainer;

Figure 4:
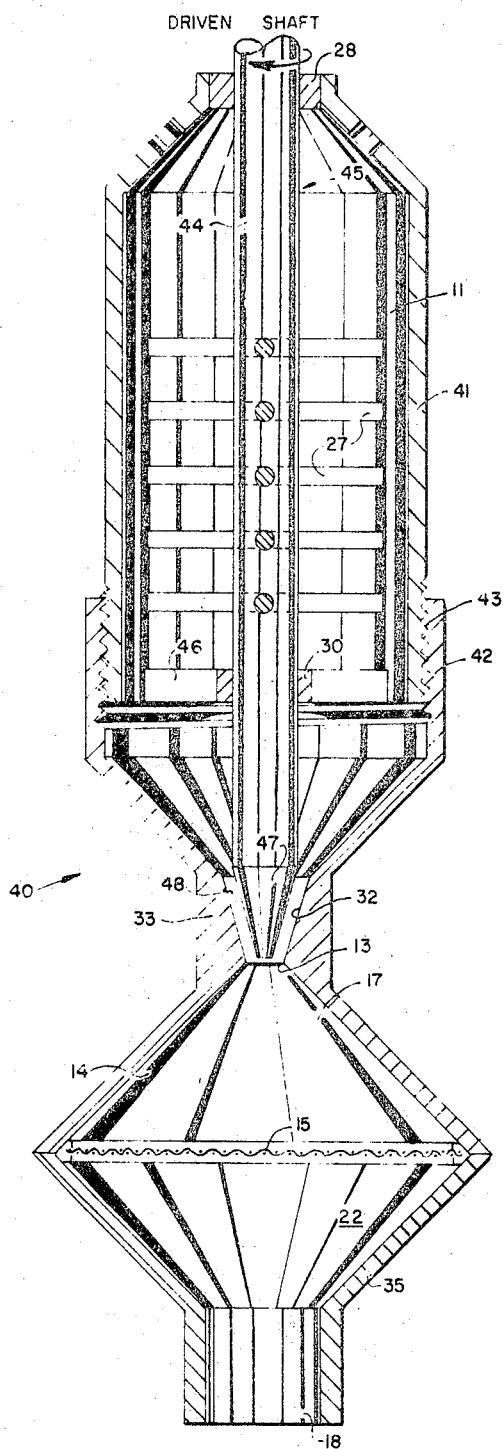
FIG. 4 is a view in side elevation and in section of a modified form of the invention, having an adjustable venturi system between the mixing chamber and the expansion chamber.
Figure 5:
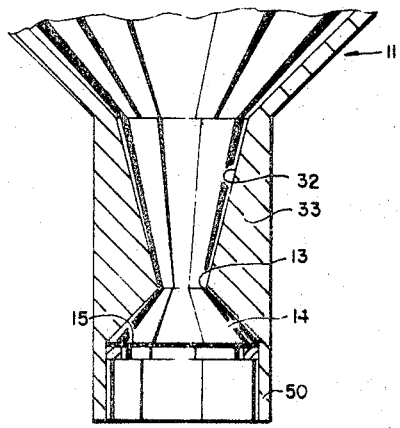
Figure 6:
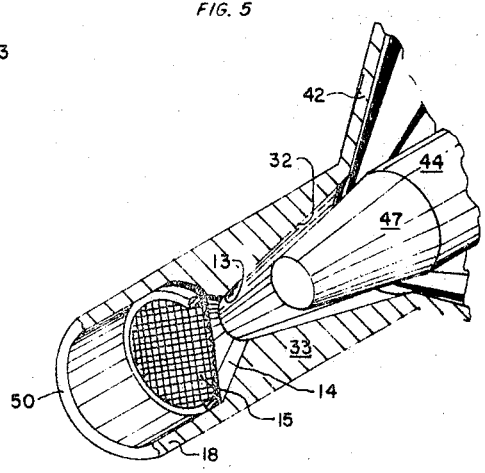

FIG. 5 is an enlarged fragmentary view in side elevation and in section of the lower portion of another modified form of device embodying the principles of the invention, in which there is no recompression chamber; and FIG. 6 is a fragmentary view in perspective and partly in section of another modified form of the invention having an adjustable venturi, as in FIG. 4, and having no recompression chamber, as in FIG. 5.

Briefly considered, the froth-producing device 10 shown in FIG. 1 comprises a pressurized mixing chamber 11 containing a rotatable mixer 12, a venturi-shaped passageway 13, and an expansion chamber 14 having a rigid porous grid 15 across its exit. The venturi passageway 13 conducts the mixed plastic from the lower end 16 of the mixing chamber 11 to the upper portion 17 of the expansion chamber 14. An outlet 18 for the strained plastic froth coming through the grid 15 may be connected by any suitable conduit (not shown) to the mold.

The operation can also be indicated briefly before describing the device in detail. The components of the plastic are introduced through inlets 20 and 21 into the upper end of the mixing chamber 11 where they are under pressure while they are rapidly but thoroughly agitated and mixed by the rotating mixer 12 into a homogeneous composition. This composition is then forced through the venturi 13 into the expansion chamber 14, where the pressure drops to slightly above atmospheric, and the composition there expands into a heterogenous froth. This froth is then forced through the porous grid 15 where it is strained to break up the larger gaseous voids and thereby produce a homogeneous foam with a uniform cell size. The plastic froth coming through the grid 15 then goes into a recompression chamber 22 which compresses the froth as it is forced toward and into the outlet 18.

The mixing chamber 11

The mixing chamber 11 in FIG. 1 is defined by an upper housing member 23 and a lower housing portion 24, joined together in a separable manner, as by threads 25, thus providing access to the interior of the chamber 11 for cleaning and the like, and also permitting removal of the mixer 12. The components of the plastic are introduced under pressure into the mixing chamber 11 through a plurality of inlets 20 and 21 in the upper part of the upper housing member 23. Suitable liquid pumps (not shown) well known in the art can be used to force the components into the chamber 11, and although only two inlets 20 and 21 are shown, more can be provided if needed or desired.

The rotatable mixer 12, comprising a shaft 26 to which are attached a number of pins or blades 27, is mounted vertically in the center of the chamber 11. The shaft 26 is journaled for rotation in an upper bearing 28 in the housing member 23 and in a lower bearing 30 which is supported by brackets 31 extending in from the wall of the lower housing member 24.

In operation of the mixing chamber, the mixer 12 is rotated by a suitable external power source (not shown), such as an electric motor, so that the pins 27 thoroughly blend the plastic components in the chamber 11. The speed of rotation of the mixer 12 which provides best mixing depends upon many factors, including the rate of introduction of the components, the nature of the components, the pressure in the chamber 11, and the rate of emergence of the mixed composition through the venturi 13. Throughout the operation of the device, the pressure in the chamber 11 is maintained at a level sufficient to prevent separation of the plastic components or boiling of any liquid used for expansion of the mixture.

The venturi 13

A tapered conduit 32 leads from the center of the bottom of the lower housing member 24 to the expansion chamber 14. As the plastic composition travels through the conduit 32, it is compressed and its flow is accelerated. Then it is discharged at the venturi throat 13 into the chamber 14. As illustrated in the drawings, the housing 33 providing the conduit 32 and the venturi 13 is preferably integral with the lower housing 20 of the mixing chamber 11 and a housing 34 for the expansion chamber 14.

Depending on the pressure involved and the rate of feed of components to the chamber 11, the velocity of the stream of emerging composition at the venturi 13 will vary. This velocity can be adjusted to a desired figure and maintained within a reasonable range by several methods, including those of governing the pressure in the mixing chamber 11, of governing the speed of flow of components into the mixing chamber 11, and of governing the nature of the components, particularly those which tend to expand the system and thus force the composition through the venturi 13 at a great speed.

When this type of control on the velocity of emerging plastic composition at the venturi 13 is not suitable, a modified form of device 40 as illustrated in FIG. 4 can be used. In this device, the mixing chamber 11 is shown as defined by a longer upper housing member 41 separably mounted on the upper end of a lower housing member 42 by threads 43. In this form of the invention, the bearing 30, journaling the lower portion of a shaft 44 of a slightly different form of mixer 45 is supported by brackets 46 which extend in from the wall of the upper housing member 41; thus the shaft 44 is mounted entirely in the upper housing member 41, instead of being mounted in both housing members 23 and 24 as is the mixer shaft 26 of FIG. 1. The shaft 44, has a lower end 47, is shaped in a frustroconical configuration and extends down into the tapered conduit 32 just above the venturi 13. By raising or lowering the upper housing member 41 with respect to the lower housing member 42, the shaft end 47 can be raised or lowered in the conduit 32, thus respectively enlarging or reducing the size of the outlet passage 48 from the mixing chamber 11 to the venturi 13. This feature provides extremely accurate control of the velocity of the composition emerging from the venturi 13.

At times it is desirable to adjust the pressure at which the mixing chamber 11 operates. Usually the pumping system which forces the components into the mixing chamber 11 is constructed to provide essentially constant flow against a wide variation in pressure head, and any reduction in the effective diameter of the venturi 13 or of the conduit 32 will increase the internal pressure of the mixing chamber. Thus the adjustable venturi system can also be used to control the pressure in the mixing chamber 11.

The expansion chamber 14

Immediately following its passage through the venturi 13 the mixed plastic composition emerges as a cellular, "sudsy" product into a generally frustro-conical shaped expansion chamber 14. As it emerges, the composition expands from one to as high as sixty times it former volume, and in so doing releases considerable energy which helps to further agitate and mix the composition. During use, the expansion chamber 14 is filled at all times with expanded plastic in fluid form, and is maintained at slightly above atmospheric pressure.

The grid 15

As the plastic composition expands in the expansion chamber 14, it tends to become a very heterogeneous product, having voids and gas pockets of many sizes. Even if the size of the venturi orifice is adjusted to the optimum rate of flow for providing as homogeneous a composition as is possible, this composition is still not uniform enough to provide satisfactory plastic foams, if delivered directly to the mold.

Adjusting pressures, components, ratios of components, and sizes of mixing and expansion chambers also fails to correct this problem. However, I have discovered that if a grid 15 is positioned across the path of the expanded foam as it leaves the expansion chamber 14, a homogeneous product of the correct cell size is produced.

The grid 15 can be constructed of wire screen or mesh, or of perforated sheet metal through which the plastic composition can flow. Wire mesh or screen is preferred, due to its lower cost and superior effectiveness. This grid 15 accomplishes two objectives; (1) it breaks up gas pockets formed by incomplete mixing, by frictional effects of the passage of the plastic composition through the venturi 13, or by uneven delivery of the components into the mixing chamber 11 by the metering system, and (2) it improves the mixing efficiency of the system without requiring an increase in the power that drives the mixer 12. Intensive velocity changes occur as the plastic composition is forced through the interstices of the grid 15, and this phenomenon also contributes to the homogeneity of the final product.

The sizes of the orifices in the grid 15 can be varied to suit particular needs; different orifice sizes will usually be used with different types of plastics. In general, screens with mesh sizes of 8–50 have been found very satisfactory for use with polyurethanes, producing an isotropic, homogeneous product.

The recompression chamber

The screened plastic may, as illustrated in FIGS. 5 and 6, be conducted directly to the system outlet 18 without recompression, if the plastic foam need not be under considerable pressure as it emerges from the system, but can issue at substantially atmospheric pressure.

Although recompression of the expanded foam emerging from the grid 15 is not always necessary, it has been observed that partial recompression imparts substantially improved flow properties to the stream of expanded product. Also, recompression is advantageous when there is a considerable distance between the mixing system and the point of application or delivery of the plastic foam, requiring considerable pressure head to force it along the conduit leading from the outlet.

When recompression is desired, the systems of FIGS. 1 and 4 are used. These systems have a recompression chamber 22 provided by a housing 35 between the exit side of the grid 15 and the system outlet 18. In this system, the outlet 18 is considerably smaller in size than the diameter of the grid 15, and the recompression chamber 22 tapers from the edge of the grid 15 to the outlet 18. Thus as the expanded foam courses from the grid 15 to the outlet 18, it is compressed.

Where there is no need for recompression of the foam, either of the systems of FIGS. 5 and 6 may be used. In both of these systems an outlet 50 is of substantially the same size as the grid 15 and is joined directly thereto. No recompression of the foam occurs after it passes through the grid, and it leaves the system without further recompression.

The systems of this invention can be used to provide excellent foams from a variety of different plastics, including polyurethanes, epoxies, phenolics, to mention a few. Since polyurethanes have grown to considerable importance in the foamed plastics field, currently occupying a prominent place in the foam market, they will be used to illustrate the use of the invention.

Polyurethane plastics are essentially the result of mixing polyisocyanates with (1) a compound containing a plurality of hydroxyl groups, and (2) water. When these components are mixed, polymerization accompanied by carbon-dioxide evolution takes place, resulting in the formation of a sponge-like cellular plastic. The physical state of the plastic product may be elastomeric, rigid, or somewhere in between, depending on the components and their proportions. This type of expansion is classified as chemical-produced, since the carbon-dioxide produced in the reaction expands and carries with it the plastic mass, thus resulting in the foam.

Physical means can also be utilized to expand cellular plastic such as polyurethanes during the course of polymerization. For instance, polyisocyanates and a compound containing a plurality of hydroxyl groups may be mixed with a basic catalyst, such as a tertiary amine, and then to this mixture may be added a non-reactive fluid, such as a chloro-fluorinated hydrocarbon which boils at a relatively low temperature. The exothermic reaction that takes place raises the temperature of the mass above the boiling point of the non-reactive fluid, causing it to boil and pass into the gaseous state, thus itself expanding and also expanding the mass of plastic into cellular foam. In these procedures, polymerization does not take place instantaneously, but over a period of time so that the plastic mass is fluid for a while before the foam is established. This enables the mass to be conducted through mixing and pre-expansion systems before it is distributed to the mold or other site of application while still in the fluid state, whereupon it is allowed to set up into its final non-fluid state by allowing the polymerization reaction to go to completion.

Where it is desirable to form cellular foams prior to any substantial completion of the polymerization reaction, preferably prior to any substantial reaction between the components themselves, the components are mixed with a liquified gas under a pressure essentially greater than the combined vapor pressures of the components, and then dispensed in partially or completely expanded form. These processes are generally known as "froth" or "pre-expansion" systems. In forming pre-expanded polyurethane foams, chlorofluorinated hydrocarbons are commonly used for expanding the plastic. Dichlorodifluoromethane, commonly called "Refrigerant 12," boils at around −22° F. and is a good expansion component for polyurethane and epoxy plastics. Trichloromonofluoromethane, commonly called "Refrigerant 11," boils at around +75° F. and is also a very suitable expansion component. Refrigerant 12 requires considerably more power than Refrigerant 11 to obtain a given cell size.

To illustrate the use of the mixing systems of my invention, a polyurethane foam was prepared from the following components.

| Component: | Parts by weight |
| --- | --- |
| Polyurethane prepolymer (25% free isocyanate content) | 100 |
| Polyether resin | 63.5 |
| Trichloromonofluoromethane | 10.0 |
| Dichlorodifluoromethane | 25.0 |
| Silicone surfactant | 0.5 |
| Tertiary amine catalyst | 1.0 |

These components were introduced under 100 p.s.i.g. pressure (20 to 150 p.s.i.g. is statisfactory) into a one-pint mixing chamber like that of FIG. 1 and then vigorously mixed by a mixer revolving at a speed of 3600 r.p.m. The contact time was 4 seconds.

The size of the orifices in the grid were varied, and in one run no grid was used. The polyurethane foam produced in the run in which no grid was used exhibited large (i.e. 1/16 inch average) and regular cell size, and striations of what appeared to be less effectively mixed components throughout. In addition, void areas of 1/8 to 1/2 inch in diameter appeared throughout the foam. The foam produced form runs using mesh grids with orifice sizes 8–50 were uniform, had small cell sizes (i.e. 1/32 inch and less in diameter) and no voids or cavities.

The proportion of open and closed cells of the products produced with the use of the different grids and that wherein no grid was used then measured by the air displacement method of Military Specification Mil–P21929. The following results were noted.

Table I

| Screen size (mesh): | Percent closed cells |
| --- | --- |
| No screen | 82 |
| 4 | 85 |
| 8 | 88 |
| 20 | 93 |
| 30 | 95 |
| 40 | 96 |
| 50 | 95 |

The variation in percent of closed cells in plastic foams produced from screens having meshes of 30, 40 and 50 respectively, are within experimental error and do not necessarily indicate that above 40 mesh the percentage of closed cells drops. Screens below 4 mesh, however, have been found relatively ineffective. Screens above 50 mesh, while effective, exhibit excessive pressure drop and are difficult to clean after they are used.

It is interesting to note that when a conventional polyurethane foam system (expanded with monofluorotrichloromethane only) is processed without a screen, small cell sizes result. The screen apparently has little effect on products which are processed in liquid form which do not expand until the polymerization process has begun and generated the necessary exothermic heat to volatilize the expanding agent.

The grid is effective in producing the desired results with systems having a pre-expanded density from one to 12 pounds per cubic foot, and is especially advantageous with those products whose final density is between one and four pounds per cubic foot.

To those skilled in the art to which this invention relates, many changes in procedure and widely differing embodiments and applications of the invention will suggest themselves without departing from the spirit and scope of the invention. The disclosures and the description herein are purely illustrative and are not intended to be in any sense limiting.

I claim:

1. A method of continuously producing homogeneous pre-expanded plastic foam, comprising the steps of
    continuously introducing plastic-foam-forming ingredients into one end of a mixing zone held under pressure,
    continuously mixing said ingredients as they flow to the other end of said zone, accelerating the flow of the mixture as it flows from said zone, expanding the mixed plastic at an expansion zone held at lower pressure than that of said mixing zone, and then straining the mixed heterogeneously expanded plastic directly as it leaves said expansion zone, so as to break up oversize cells and destroy voids therein.

2. The method of claim 1 followed by recompressing the strained plastic and raising its pressure.

3. A method of producing a homogeneous pre-expanded plastic foam, comprising the steps of mixing the plastic-foam-forming ingredients expanding the mixed plastic at a pressure only slightly above atmospheric, and then straining the expanded plastic directly after it is expanded, so as to break up oversize cells and destroy voids therein.

4. The method of claim 3 followed by repressurizing the strained plastic.

5. A method of continuously producing homogeneous pre-expanded plastic foam, comprising the steps of continuously separately introducing in proportional amounts a plurality plastic-foam-forming ingredients into one end of a mixing zone maintained at a pressure considerably above atmospheric, mixing said ingredients thoroughly in said mixing zone as they flow from said one end to the other end, gradually narrowing the flowing stream of mixed plastic as it leaves said zone, so as to accelerate its flow, considerably widening the flowing stream of mixed plastic in an expansion zone held at only slightly above atmospheric pressure, so as to cause the plastic to expand heterogeneously, and then straining the heterogeneously expanded plastic directly as it leaves said expansion zone, so as to break up oversize cells and destroy voids therein.

6. The method of claim 5 wherein the strained plastic is thereupon recompressed and its pressure raised above that in said expansion zone.

7. Apparatus for producing homogeneous pre-expanded plastic, including in combination first housing means defining a mixing chamber having a plurality of inlet means for the various ingredients of the plastic at one end and an outlet for mixed plastic at an opposite end, mixing means in said first housing means between said inlets and said outlet, second housing means defining an expansion chamber, venturi means connecting said mixing chamber to said expansion chamber, said expansion chamber flaring from said venturi means to a maximum-width portion, and straining means supported by said second housing means at said maximum width portion.

8. The apparatus of claim 7 having means for varying the cross-sectional passage through said venturi means.

9. Apparatus for producing homogeneous pre-expanded plastic, including in combination housing means defining a mixing chamber having a plurality of inlet means for the various ingredients of the plastic at one end and an outlet for the mixed plastic at an opposite end, a rotating shaft rotatably mounted in said housing means and having mixing blades between said inlets and said outlet, enclosing means defining an expansion chamber, venturi means connecting said mixing chamber to said expansion chamber, said expansion chamber flaring from said venturi means to a maximum width, and said shaft having a lower end extending into said venturi means, means for raising and lowering said shaft relative to said venturi means so as to widen and narrow the passage for the plastic at said venturi means, and straining means supported by said enclosing means at said maximum width.

10. The apparatus of claim 9 having means defining a recompression chamber joined to the expansion chamber at said straining means, said recompression chamber being tapered from a maximum width at said straining means to a smaller width at an outlet therefrom.

11. Apparatus for producing homogeneous pre-expanded plastic, including in combination an upper housing defining a mixing chamber having a plurality of inlet means at an upper end for the various ingredients of the plastic and an outlet at a lower end for the mixed plastic, a rotating shaft rotatably mounted vertically in said housing means and having mixing blades thereon between said inlets and said outlet, a lower housing with diverging walls defining an expansion chamber, a venturi passage connecting said mixing chamber to said expansion chamber, said expansion chamber flaring from said venturi means to a greater width, and a screen supported by said expansion chamber at said greater width, said lower housing also defining a recompression chamber joined to said expansion chamber and on the opposite side of said screen therefrom, said recompression chamber being tapered from a greater width at said screen to a smaller width at an outlet.

12. The apparatus of claim 11, wherein said upper housing has an upper portion and a lower portion threadedly secured together and said shaft is supported solely by said upper portion and has a lower end extending into said venturi passage, whereby by turning said upper portion relatively to said lower portion said shaft is raised and lowered relative to said venturi passage so as to widen and narrow said venturi passage.

13. The apparatus of claim 11 wherein the screen is from 20 to 50 mesh.

References Cited by the Examiner

UNITED STATES PATENTS

| 2,307,082 | 1/43 | Grotenhuis | 264—50 |
| 2,387,488 | 10/45 | Acken | 259—8 X |
| 2,424,932 | 7/47 | Juhasz | 259—44 X |
| 2,957,203 | 10/60 | Marshall | 259—7 |
| 2,990,380 | 6/61 | Auerback | 259—8 X |
| 3,005,624 | 10/61 | Hoppe | 259—43 X |

WALTER A. SCHEEL, *Primary Examiner.*

GEORGE J. NORTH, CHARLES A. WILLMUTH,
*Examiners.*

UNITED STATES PATENT OFFICE
CERTIFICATE OF CORRECTION

Patent No. 3,208,958            September 28, 1965

Roger G. Jennings

It is hereby certified that error appears in the above numbered patent requiring correction and that the said Letters Patent should read as corrected below.

Column 2, line 53, for "heterogenous" read -- heterogeneous --; column 3, line 46, for "great speed" read -- greater speed --; column 7, line 13, after "ingredients" insert -- under pressure much greater than atmospheric, --; column 8, line 7, strike out "and".

Signed and sealed this 2nd day of August 1966.

(SEAL)
Attest:

ERNEST W. SWIDER            EDWARD J. BRENNER
Attesting Officer            Commissioner of Patents